United States Patent Office 3,704,279
Patented Nov. 28, 1972

3,704,279
PRODUCTION OF HALOGEN-CONTAINING
POLYARYL ESTERS
Roshdy Ismail, Neunkirchen, Germany, assignor to Dynamit Nobel Aktiengesellschaft, Troisdorf, Postfach, Germany
No Drawing. Filed July 28, 1971, Ser. No. 166,686
Claims priority, application Germany, Aug. 1, 1970, P 20 38 287.0; Apr. 29, 1971, P 21 21 093.5
Int. Cl. C08g 17/003
U.S. Cl. 260—61
12 Claims

ABSTRACT OF THE DISCLOSURE

In the production of halogen-containing polyaryl esters by the polycondensation of halogen-containing diphenols and aromatic acid dichlorides in the presence of a catalyst comprising a tertiary amine, an acid amide or mixtures thereof, the improvement which comprises effecting the condensation in the presence of about 0.001 to 50 mole-percent based on the acid dichloride, of at least one activator selected from the group consisting of magnesium compounds, and oxides, chlorides or hydroxychlorides of Cu, Zr, Sn, Ti, V, Pb and Fe. The condensation is preferably effected in solution, using as activated CuO, CuCl, $ZrCl_4$, $SnCl_2$, $TiCl_4$, $VOCl_3$, PbO, $Fe_2O_3$ or an alloy of Mg, Cu, Zr, Sn, Ti, V, Pb or Fe. In this manner high molecular weights can be attained in short reaction times.

The invention relates to a novel catalytic process for the production of halogen-containing polyaryl esters.

Halogen-containing polyaryl esters are prepared in the prior art by the polycondensation of aromatic acid dichlorides and halogen-containing bivalent phenols, with the evolution of hydrogen chloride. The reaction is very slow without a catalyst, and high molecular weights are not achieved. Neither metal compounds, such as salts and oxides of the metals Ti, V, Zr, Mg and Al, nor the elemental metals themselves act as catalysts in a reaction mixture of this kind. Tertiary amines as well as acid amides, however, are known to exhibit desirable catalytic activity in these special types of polycondensation. When such catalysts are used, and if the usual conditions of the reaction prevail, molecular weights are achieved corresponding to a reduced viscosity of about 1 to 1.8, and 40 to 50 hours are required in order to achieve this degree of polymerization. The "reduced viscosity" $\eta_{red.}$ referred to herein is defined as follows:

$$\eta_{red.} = \frac{\eta_{spec.}}{c} \left(\eta_{spec.} = \frac{\eta}{\eta_o} - 1; \eta = \text{viscosity of an } 0.5\% \text{ solution in chloroform.} \; \eta_o = \text{viscosity of the solvent}\right).$$

Now, it has surprisingly been found that the progress of the polycondensation in reaction mixtures of this kind, which contain tertiary amines or acid amides as catalysts, can be considerably accelerated by adding to the mixture the following accelerants which are by themselves inactive as catalysts: magnesium or a magnesium compound, an oxide, chloride or hydroxychloride of Cu, Zr, Sn, Ti, V, Pb or Fe, or mixtures of these substances in the form of powder, granules or chips. This acceleration of the reaction takes place only when a tertiary amine and/or an acid amide and the magnesium or one of the above substances or mixtures thereof, as the case may be, are present in the reaction mixture. Evidently, the magnesium and the above metal compounds act as activators for the conventional catalysts. These substances, therefore, can also be referred to as co-catalysts. Attainment of the desired higher degrees of polycondensation, or viscosities of about 1 to 1.8, can be realized in substantially shorter reaction times in this manner.

The subject of the present invention, therefore, involves a process for the manufacture of halogen-containing polyaryl esters by the polycondensation of halogen-containing diphenols and aromatic acid dichlorides, mixed in some cases with non-halogenated diphenols and aliphatic acid dichlorides, with the use of tertiary amines and/or acid amides as catalysts according to known procedures, this process being characterized by the fact that to the reaction mixture there is added about 0.001 to 50 mole-percent, preferably about 0.01 to 5 mole-percent, based on the quantity of acid dichloride, of one or more co-catalysts or activators selected from the group consisting of magnesium, magnesium compounds, and oxides, chlorides or hydroxychlorides of Cu, Zr, Sn, Ti, V, Pb and Fe, in the form of powders, granules or chips.

The polycondensation in accordance with the invention is preferably performed using organic solvents, and at temperatures of about 50 to 250° C., preferably about 80 to 180° C., in conventional manner.

The reaction in accordance with the above invention is preferably performed at normal pressure. It can, however, also be performed at higher or lower pressures, elevated pressure accelerating the polycondensation.

For the preparation of the polyesters of the halogenated diphenols, dicarboxylic acid dichlorides and halogenated diphenols are used preferably in approximately stoichiometric ratio, i.e., one mole of halogenated bivalent phenol is used for each mole of dicarboxylic acid chloride. An excess of up to about 5 mole-percent of the phenol can serve for the adjustment of the desired molecular weight. The use of an excess of bivalent phenols makes possible the preparation of oligomers or polymers with hydroxyl end groups. The use of stoichiometric quantities of bivalent phenols, however, results in products with chlorine end groups.

In addition to magnesium, MgO and $MgCl_2$ are also especially suitable as co-catalysts or activators for carrying out the process in accordance with the invention. Other magnesium compounds, however, can also be used, such as, for example, magnesium methylate, magnesium carbonate or magnesium propylate, and even magnesium alloys. The following compounds, especially, are also suitable: CuO, CuCl, $ZrCl_4$, $SnCl_2$, $TiCl_4$, $TiO_2$, $VOCl_3$, PbO and $Fe_2O_3$.

The quantities required for the activity of the co-catalysts range from about 0.001 to 50 mole-percent, preferably about 0.01 to 5 mole-percent, based on the quantity of the acid dichloride. The exact quantities by which optimum activation is achieved differ to some extent according to the substance used. The co-catalysts are present in the reaction mixture preferably in the undissolved state during the polycondensation.

For medium and large technical batches, especially when the reaction mixture is circulated through the co-catalyst, the basic amount of co-catalyst often ranges from about 2 to 50 mole-percent, preferably about 5 to 10 mole-percent. It is possible to operate according to the invention with even greater amounts of activators than 50 mole-percent, such as 100 or 200 mole-percent, for example. In general, however, such as increase in the amount of activator does not result in any further augmentation of the catalysis, because the optimum surface area of the material that is heterogeneously present in the reaction mixture is achieved with lesser quantities. Such large amounts, however, may often be advantageous for technical reasons relating to the process.

Individual and mixed tertiary amines and acid amides having aliphatic, cycloaliphatic, aromatic and heterocyclic radicals are suitable as basic catalysts for the process of the invention.

Suitable tertiary amines whose amino group is not a component of an aromatic ring system and which contain aliphatic radicals are, for example: trimethylamine, triethylamine, triisopyropylamine, triisobutylamine, monoethyldiisopropylamine, monoethyl-di-n-butylamine, tri-n-butylamine, N,N,N',N' - tetramethylbutanediamine-(1,4), N,N,N',N'-tetramethylethylenediamine, substituted or unsubstituted tertiary aliphatic amines such as β-chloropropyldipropyldiamine, tris(β-ethoxyethyl)-amine, N,N-di-n-butylaminoacetonitrile, N,N - diisopropylaminoacetonitrile, N-n-butyl-N-methylaminoacetonitrile, and the like. Dimethylcyclohexylamine is an example of the series of amines with cycloaliphatic radicals. Furthermore, there are also some suitable amines with aromatic radicals such as N,N-dialkylanilines, e.g. N,N-dimethylaniline and N,N-diethylaniline, etc., p-bromophenyldimethylamine, 2,4-dinitrophenyldimethylamine and benzyldimethylamine, p-nitrophenyl-di-n-butylamine, 2,4 - dichclorophenyldiethylamine, N,N,N',N'-tetramethylbenzidine. Examples of suitable heterocyclic nitrogen compounds are: N-alkyl and N-aryl morpholines such as N-n-butylmorpholine, N-phenylmorpholine and N-(4-methylphenyl)-morpholine, morpholine acetic acid morpholide, N,N-dialkyl or N,N-diaryl piperazines such as N,N-dimethylpiperazine, N,N-di-n-butylpiperazine and N,N-diphenylpiperazine, N-substituted piperidine derivatives, N-aryl and N-alkyl tetrahydroquinolines and the tetrahydroisoquinolines such as N-n-propyltetrahydroquinoline, N - phenyltetrahydroisoquinoline, N-alkyl and N-aryl pyrrolidines and their derivatives such as N-methylpyrrolidine, N-n-butylpyrrolidine and N-phenylpyrrolidine, and substituted or unsubstituted derivatives of the above-named compounds. Among the above tertiary amines, those which contain nitrile groups have proven to be especially suitable.

Suitable tertiary amines whose amino group is a component of an aromatic ring system are aromatic tertiary amines such as quinoline, isoquinoline, pyrazine, oxazine, oxoxazole, thiazole, oxadiazole, benzothiazole, and the like.

The tertiary amines described can, of course, be replaced as catalysts by the corresponding hydrochlorides and the salts formed from the halogenated phenols and the tertiary amines in appropriate molar percentages.

Suitable N-monosubstituted, or disubstituted, or unsubstituted acid amides are the carboxylic acid amides of mono- or di-basic aliphatic, aromatic and araliphatic carboxylic acids with 1 to 18 carbon atoms.

The mono- or di-basic acids mentioned, such as formic acid, acetic acid, propionic acid, butyric acid, caproic acid, 2-ethylhexanoic acid, caprylic acid, lauric acid, palmitic acid, stearic acid, benzoic acid, phenyl acetic acid and phenyl butyric acid, can be straight-chained or branched, or their alkyl chains can be interrupted by a keto group, as in the case of pyruvic acid, acetoacetic acid or levulinic acid. Dibasic acids such as tere- or isophthalic acids can be used to prepare the amide.

Ammonia or mono- or diamines are suitable basic components of the acid amides involved. Primary or secondary mono- or diamines which are derived from the saturated aliphatic, araliphatic or cycloaliphatic series or from the aromatic series with only one aromatic ring are preferred. Examples of the amines are methylamine, dimethylamine, di-n- and di-i-propylamine, di-n- and di-isobutylamine, di-2-methylhexylamine, dilaurylamine, ethylenediamine, tetramethylenediamine, hexamethylenediamine, cyclohexylamine, dicyclohexylamine, benzylamine, dibenzylamine, aniline, N-methylaniline, toluidine, phenylenediamine, hexahydrophenylenediamine, and the like. One or both alkyl groups of the amines can also be replaced or substituted by the phenyl or tolyl radical or by cycloalkyl groups with 5 to 6 carbon atoms in the ring, which in some cases can be additionally substituted by alkyl groups, especially one or two methyl groups. Of the diamines that are particularly suitable for the preparation of the acid amides, special mention is made of those in which the two amino groups are separated by one to eight methylene groups. In the case of the diamines, too, all but one of the hydrogen atoms still bound to the nitrogen atom can be substituted, e.g., by alkyl groups with 1 to 4 carbon atoms, by the phenyl or tolyl radical, or by a cycloalkyl radical of 5 to 6 members. The following can be listed as representatives of especially suitable carboxylic acid amides which can be used according to the invention: formamide, methylformamide, acetamide, N,N-dimethylacetamide, N,N-di-n- and N,N-di-i-propylbutyric acid amide, N-benzylbutyric acid amide, N,N-dipropyl-2-ethylhexanoic acid amide, acetoacetic acid-N,N-di-n-butylamide, acetoacetic acid anilide, benzoic acid benzyl amide, N,N-dimethylbenzoic acid amide, and N,N-diformylhexamethylenediamine. Cyclic acid amides and imides can also be used.

It is not necessary to use the fully prepared amides directly as catalysts; instead, their components can be used, e.g., a mixture of a primary or secondary monoamine or diamine of the above-named kind and one of the above-mentioned monocarboxylic acids or of the acid chlorides or anhydrides derived from these acids, since the acid amides then form under the conditions of the reaction. Of course, mixtures of the above-named amides and acid amides or of their quaternary ammonium salts such as trimethylbenzylammonium chloride, triethylbenzylammonium hydroxide or acetate, or triethylammonium hydrochloride, can be used as catalysts.

The tertiary amines and acid amides used as primary catalysts are used in quantities of about 0.01 to 20 mole-percent, preferably about 0.1 to 2 mole-percent based on the acid halide. They can also be added to the batches either all at once or incrementally.

The reaction is performed preferably in solution, i.e., in solvents which are inert in use, in which case the inert solvent can function both as a true solvent and as a dispersant. Suitable inert solvents in the meaning of the present invention include both aliphatic and aromatic hydrocarbons, as well as simple and cyclic ethers. The aliphatic hydrocarbons can be either single compounds or mixtures, such as isooctane, and benzine fractions such as those with a boiling range of 120 to 200° C. Cycloaliphatic compounds such as decahydronaphthalene can also be used. Benzene, toluene, xylene, and isomeric mixtures of hexylcumene, cyclohexyltoluene, cyclohexylethylbenzene, isopropylethylbenzene, dihexylbenzenes, di-p-tolylmethane, and diphenyl and the like, are examples of suitable aromatic hydrocarbons.

Some of the ethers which are suitable as solvents are: diisopropyl ether, diisoamyl ether, dimethyl ethers of ethylene and diethylene glycol, diphenyl ether, 1,4-dioxane etc. This list shows that both aliphatic and aromatic as well as cyclic and open-chain ethers can be used. Also usable are polar solvents such as nitrobenzene, dimethylsulfoxide and dimethylformamide. Also suitable are solvents such as chlorinated aliphatic and aromatic hydrocarbons, e.g. tetrachlorethane, tetrachlorethylene, pentachlorethane, o-dichlorbenzene, trichlorbenzenes, β,β'-dichlorethylbenzene, monochlorbenzene, etc.

Suitable starting materials for the process of the invention are mono-or polynuclear, halogenated, bivalent, optionally alkyl-substituted phenols, which may be either condensed or uncondensed.

Examples of suitable halogenated, bivalent phenols are, for example, the mononuclear phenols which are derived from hydroquinone, resorcinol and pyrocatechol, such as 2-chloro and 2-bromo-hydroquinone, tri- and tetrachlorohydroquinone, 2,4,6-tribromoresorcinol, and the like.

Polynuclear bivalent halogenated phenols whose nuclei are not condensed are defined by the general formula:

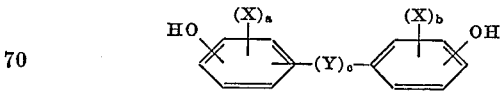

in which the several X substituents are identical or different halogen atoms, $a$ and $b$ are whole numbers from 1 to 4, Y is oxygen, a carbonyl, sulfide or sulfone group, or an alkylene radical with or without a phenyl substitution, and c is 0 or 1. Basic types of these phenols, prior to halogenation, include the dihydroxydiphenyls, such as 2, 2'-, 2,4'-, 3,3'-, and 4,4'-dihydroxydiphenyl, 4,4'-dihydroxy - 2-methyldiphenyl, 4,4'-dihydroxy-2,2'-dimethyldiphenyl, 4,4' - dihydroxy - 3,3'-dimethyldiphenyl, 6,6'-dihydroxy - 3,3' - dimethyldiphenyl, etc.; dihydroxybenzophenones, such as 2,2'-, 2,3'-, 2,4'-, 3,3'-, 3,4'-, 4,4'-, 4,6'- and 6,6'-dihydroxybenzophenone and the like; dihydroxydiphenylsulfides, such has 2,2'- and 4,4'-dihydroxydiphenylsulfide; dihydroxydiphenylsulfones, such as 2,2'- and 4,4' - dihydroxydiphenylsulfones; dihydroxydiphenylalkanes, such as 2,2'- and 4,4'-dihydroxydibenzyl, 2,2'-, 2,3'-, 2,4'-, 2,5'-, 2,6'-, 3,3'-, 3,4'-, 4,4'-, 4,5'- and 6,6'-dihydroxydiphenyl-2,2-propane, 2,2'- and 4,4'-dihydroxydiphenylmethane, 4,4' - dihydroxydiphenylmethylmethane, 4,4' - dihydroxydiphenylphenylmethane, 4,4'-dihydroxydiphenyldiphenylmethane, etc.

From these types are derived the halogenated bivalent phenols used in accordance with the invention, such as:

2,2-bis-(3,5-dichloro-4-hydroxyphenyl)-propane,
2,2-bis-3,5-dibromo-4-hydroxyphenyl)-propane,
4,4'-dihydroxy-5,5'-difluorodiphenylmethane,
1,1-bis-(3,5-dichloro-4-hydroxyphenyl)-1-phenylethane,
2,2-bis-(3,5-dibromo-4-hydroxyphenyl)-hexane,
4,4'-dihydroxy-3,3',
5,5'-tetrachlorodiphenyl, and the like, as well as the corresponding tetrabromo and tetrachloro derivatives of 4,4'-dihydroxydiphenyl ether, 4,4'-dihydroxybenzophenone and 4,4'-dihydroxydiphenylsulfone.

The polynuclear condensed bivalent phenols are derived essentially from the dihydroxynaphthalenes, as for example from the 1:3-, 1:4-, 1:5-, 1:6-, 1:7-, 1:8-, 2:6- and 2:7 - dihydroxynaphthalenes. Suitable halogenated phenols of this kind are, for example, the dichloro and dibromo compounds as well as the tetrabromo and tetrachloro dihydroxynaphthalenes, and also 3,5,3',5'-tetrachloro and 3,5,3',5'-tetrabromophenolphthalines and their isomers.

In addition to alkyl groups, the phenyl groups of the above-named bivalent phenolic compounds can also have alkoxy, carboxy and phenoxy groups as substituents. Of course, mixtures of the above-named halogenated phenols can be used for the reaction in accordance with the invention.

The addition of non-halogenated phenols to the halogenated phenols is also conceivable within the invention, such added substances preferably corresponding to the above-noted phenols free of halogenation.

Particularly suitable aromatic acid chlorides for the practice of the invention are the dichlorides of terephthalic, phthalic, isophthalic and tetrachlorophthalic acids. Other suitable aromatic acid chlorides are the chlorides of diphenyl-4,4'-dicarboxylic acid and diphenyl-2,2'-dicarboxylic acid.

In like manner, the bischloroformic acid esters which are obtained by the reaction of diphenols with phosgene are suitable are aromatic acid chlorides for the reaction of the invention, especially 2,2-bis-(4-chloroformic acid phenyl-ester)-propane and 2,2-bis-[4-chloroformic acid-(3,5-dichlorophenyl)-ester]-propane. The bischloroformic acid esters used for the synthesis of the polyesters of the invention can be prepared by known processes through the reaction of diphenols with phosgene in the presence of tertiary amines as catalysts (see Makromol. Chem. 57, 1 (1962)). Preferred diphenols for the preparation of the bischloroformic acid ester are 2,2-bis-(4-hydroxyphenyl)-propane,
2,2-bis-(3-chloro-4-hydroxyphenyl)-propane,
2,2-bis(3,5-dibromo-4-hydroxyphenyl)-propane,
2,2-bis-(3,5-dichloro-4-hydroxyphenyl)-propane,
tetrachlorodiphenylolsulfone and
4,4'-dihydroxydiphenyl.

These aromatic dicarboxylic acid chlorides can also be used in admixture with aliphatic or cycloaliphatic acid chlorides.

Suitable aliphatic, saturated and unsaturated dicarboxylic acid chlorides are, for example, those of oxalic, malonic, succinic, glutaric, adipic, pimelic, suberic, azelaic, sebacic, fumaric and itaconic acids, and the like.

Examples of suitable cycloaliphatic carboxylic acids are tetrahydrophthalic and hexahydrophthalic acids, hexachloroendomethylenetetrahydrophthalic acid, and the like, which can be prepared by the diene synthesis involving condensation of unsaturated dicarboxylic acids or their chlorides with 1, 4-dienes, in some cases with post-hydrogenation of the double bond.

The processing of the end products can be performed by conventional methods. When solvents are used as the medium for the condensation, the polyester can be isolated by removing the solvent or by precipitating the polymer, which is best done with polar solvents such as methanol, ethanol, acetone, tetrahydrofurane, and the like.

The polymers produced according to the invention have a high thermostability and are fire retardant, being especially useful for example, for varnishes, coatings, and insulating, injection molding and compression molding compounds.

The polymers manufactured can be fabricated into sheets by known methods, as for example by casting from solutions in chlorinated hydrocarbons. Because of their good electrical properties, such sheets are particularly important in the electrical field.

The following examples will serve to illustrate the process of the invention.

EXAMPLE 1

In a three-necked flask provided with stirrer, condesner and introduction tube, 73.2 g. of 2,2-bis-(3,5-dichloro-4-hydroxyphenyl)-propane, 20.3 g. of isophthalic acid dichloride, and 20.3 g. of terephthalic acid dichloride were made to react, with refluxing, in 600 ml. of O-dichlorobenzene (with the introduction of nitrogen) in the presence of 0.5 ml. of tri-n-butylamine and 0.055 g. of magnesium chips. After 20 hours the theoretical amount of HCl had been evolved. The polymer was precipitated from solution by means of methanol.

Reduced viscosity at 25° C: 1.42.

The same results were obtained using triethylamine, N,N-dimethylaniline or N,N - dimethylcyclohexylamine instead of tri-n-butylamine.

EXAMPLE 2

(Experiment for purposes of comparison)

In a three-necked flask provided with stirrer, condenser and introduction tube, 73.2 g. of 2,2-bis-(3,5-dichloro-4-hydroxyphenyl)-propane, 20.3 g. of isophthalic acid dichloride, and 20.3 g. of terphthalic acid dichloride were reacted in 600 ml. of O-dichlorobenzene (with the introduction of nitrogen) in the presence of 0.5 ml. of tri-n-butylamine.

After 20 hours the theoretical amount of HCl had been evolved. The polymer was precipitated in methanol.

Reduced viscosity at 25° C.: 0.92.

The same results were obtained using triethylamine, N,N-dimethylaniline or N,N - dimethylcyclohexylamine instead of tri-n-butylamine.

EXAMPLES 3 TO 7

The same procedure was followed as in Example 1, but quinoline was used as the basic catalyst instead of tri-n-butylamine, using the co-catalysts listed in Table 1 in the stated quantities, instead of magnesium chips, with the results set forth in Table 1. Example 4 is an experiment preformed for purposes of comparison, without the use of a co-catalyst or activator. It shows that, even at the long reaction time of 48 hours, a reduced viscosity of only 1.05 is attained.

TABLE 1

| Example number | Basic catalyst type | Quantity in ml. | Co-catalyst type | Quantity in G. | Quantity in Mole, percent | Reaction time in hours | Reduced viscosity |
|---|---|---|---|---|---|---|---|
| 3 | Quinoline | 0.5 | Mg chips | 0.024 | 0.5 | 18 | 1.42 |
| 4 | do | 0.5 | None | | | 48 | 1.05 |
| 5 | do | 0.5 | MgCl₂ | 0.095 | 0.5 | 21 | 1.35 |
| 6 | do | 0.5 | MgO | 0.04 | 0.5 | 22 | 1.18 |
| 7 | do | 0.5 | MgO | 0.02 | 0.25 | 27 | 0.92 |

EXAMPLE 8

(Experiment for purposes of comparison)

36.6 g. of 2,2-bis-(3,5-dichloro-4-hydroxyphenyl)-propane, 20.3 g. of isophthalic acid dichloride and 20.3 g. of terephthalic acid dichloride were reacted in 400 ml. of O-dichlorobenzene in the presence of 20 mg. of MgO in the same reaction vessel as described above. After 48 hours the polymer was precipitated, washed and dried. The reduced viscosity was 0.4.

The same viscosity was achieved whenever Mg or other magnesium compounds, such as magnesium methylate, were used in similar experiments. The experiments show that the cocatalysts are completely ineffective unless the basic catalyst, e.g. tertiary amine, is also present. The polycondensation takes place precisely the same as it does when the metal or metal compound is absent from the reaction mixture.

EXAMPLE 9

The experiments of Example 8 were repeated, except that tributyl amine was added to the reaction mixture as the basic catalyst, in a quantity of 0.5 ml. In these cases the reactions were completed in only 24 hours or less. The polymers obtained had a reduced viscosity of 1.1 throughout.

EXAMPLE 10

13.7 g. of 2,2-bis-(4-hydroxyphenyl)-propane and 40.6 g. of terephthalic acid dichloride were made to react in the presence of 20 mg. of Mg chips and 0.5 ml. of quinoline, in 500 ml. of O-dichlorobenzene. By the end of 3 hours the evolution of HCl had ended. Then 5.24 g. of 2,2-bis-(3,5-dichloro - 4 - hydroxyphenyl)-propane was added. 24 hours later the reaction had ended. The resulting polymer had a reduced viscosity of 1.1.

EXAMPLE 11

(a) Preparation of 2,2-bis-(4-chloroformic acid phenyl ester)-propane

In a 2-liter flat-ground flask provided with stirrer, condenser, dropping funnel, thermometer and introduction tube, 145 ml. of gaseous phosgene was introduced, with stirring, into a mixture of 700 ml. of toluene and 159.6 g. of 2,2-bis-(4-hydroxyphenyl)-propane at 8° C. (phosgene from a bottle was liquefied in a refrigerated trap). Then the mixture was chilled to −10° C. and, at this temperature, 170 g. of N,N-dimethylaniline dissolved in the same amount of toluene was added dropwise over an hour, with stirring. The reaction mixture was stirred for an additional 4 hours while it warmed up to room temperature and the amine hydrochloride precipitated. The mixture was cooled, 10% hydrochloric acid solution was added twice, and this was followed by washing with water and then by drying over Na₂SO₄. After removal of the solvent by distillation, the product was distilled under a high vacuum at 201–203° C. and 0.6 mm. Melting point: 94 to 96° C.

(b) 36.6 g. (0.1 mole) of 2,2-bis-(3,5-dichloro-4-hydroxyphenyl)-propane, 8.83 g. (0.025 mole) of 2,2-bis-(4-chloroformic acid phenyl ester)-propane and 15.26 g. (0.075 mole) of terephthalic acid dichloride were made to react in 500 ml. of O-dichlorobenzene in the presence of 20 mg. of magnesium chips and 0.5 ml. of quinoline. 24 hours later the reaction had ended. Precipitation with methanol, followed by washing and drying, yielded a polymer with a reduced viscosity of 1.1.

EXAMPLE 12

The procedure was the same as in Example 6, except that 750 ml. of monochlorobenzene was used as the solvent instead of 600 ml. of O-dichlorobenzene. 16 hours later, most of the HCl (over 90% of the theoretical maximum) had escaped. Then the pressure was increased by the addition of nitrogen to 5 atmospheres gauge and the polycondensation was continued. Any HCl gas that might be present was purged by releasing the pressure at the upper end of the condenser once an hour, and then the reaction was continued under 5 atmospheres. After a total of 36 hours the reaction had finally come to a stop. After the usual processing of the polymer, the reduced viscosity was determined to be 1.1.

EXAMPLE 13

The procedure was the same as in Example 1, except that 0.258 ml. of dibutylamine was used instead of tri-n-butylamine. The reaction took place at 180° C. within 24 hours with the evolution of HCl. The polymer obtained was precipitated by means of methanol. Its reduced viscosity (as measured in a 5% solution in chloroform) was 1.54.

This experiment shows the good catalytic effect of the acid amide even when formed in situ. Equivalent results can be obtained by the substitution of dipropylamine, dicyclohexylamine, dibenzylamine or N-methylaniline for the dibutylamine.

EXAMPLE 14

In a three-necked flask provided with stirrer, condenser and introduction tube, 73.2 g. of 2,2-bis-(3,5-dichloro-4-hydroxyphenyl)-propane, 20.3 g. of isophthalic acid dichloride, and 20.3 g. of terephthalic acid dichloride were reacted in the presence of 0.25 ml. of dibutylamine and 0.99 g. (0.5 mole-percent) of copper (I) chloride in 600 ml. of O-dichlorobenzene, with the introduction of nitrogen. 22 hours later the theoretical amount of HCl had escaped and the reaction had ended. The polymer was precipitated by means of methanol. Reduced viscosity at 25° C: 1.03 (0.5% solution in chloroform).

EXAMPLE 15

Under the same conditions as in Example 14, 73.2 g. of 2,2-bis-(3,5-dichloro-4-hydroxyphenyl)-propane, 20.3 g. of isophthalic acid dichloride, and 20.3 g. of terephthalic acid dichloride were reacted in the presence of 0.5 ml. of tributylamine and 2.33 g. of zirconium tetrachloride (5 mole-percent) in 600 ml. of orthodichlorobenzene. After 2.5 hours the solution had become highly viscous due to the formation of the polyaryl ester. The polymer, which was then precipitated by means of methanol, had a reduced viscosity of 1.05 (0.5% solution in chloroform at 25° C.).

EXAMPLE 16

The procedure was similar to Example 15, except that the amount of zirconium tetrachloride was reduced to 0.93 g. (2 mole-percent). 6 hours later the reaction had ended. The reduced viscosity amounted to 1.28.

EXAMPLE 17

The procedure was similar to Example 15, except that the amount of zirconium tetrachloride was reduced to 0.233 g. (0.5 mole-percent). 22 hours later the reaction had ended. The reduced viscosity amounted to 1.25.

EXAMPLE 18

In a three-necked flask such as the one used in Example 14, 73.2 g. of 2,2-bis-(3,5-dichloro-4-hydroxyphenyl)-propane, 20.3 g. of isophthalic acid dichloride and 20.3 g. of terephthalic acid dichloride were reacted in the presence of 0.5 ml. of quinoline and 0.19 g. of tin (II) chloride (0.5 mole-percent) in 600 ml. of O-dichlorobenzene. The reaction ended within 22 hours. The polymer precipitated by methanol had a reduced viscosity of 1.20.

EXAMPLE 19

Under the same conditions as described in the foregoing examples, 73.2 g. of 2,2-bis-(3,5-dichloro-4-hydroxyphenyl)-propane, 20.3 g. of isophthalic acid dichloride and 20.3 g. of terephthalic acid dichloride were reacted in the presence of 0.5 ml. of quinoline and 0.78 g. of titanium (IV) chloride (2 mole-percent), in 600 ml. of orthodichlorobenzene. 24 hours later the polyaryl ester was precipitated from its highly viscous solution by addition of methanol. The reduced viscosity was 2.2.

EXAMPLE 20

73.2 g. of 2,2 - bis-(3,5-dichloro-4-hydroxyphenyl)-propane, 20.3 g. of isophthalic acid dichloride and 20.3 g. of terephthalic acid dichloride were made to react in the presence of 0.5 ml. of quinoline and 0.08 g. of copper oxide (0.5 mole-percent) in 600 ml. of orthodichlorobenzene. 22 hours later the reaction had ended. The polymer precipitated by methanol had a reduced viscosity of 0.96.

EXAMPLE 21

The same procedure as in Example 20 was followed, except that 0.159 g. of iron (III) oxide (0.5 mole-percent) was used instead of copper oxide. The reaction ended in 22 hours. The polymer precipitated by methanol had a reduced viscosity of 1.0.

EXAMPLE 22

As in Example 14, 73.2 g. of 2,2-bis-(3,5-dichloro-4-hydroxyphenyl)-propane, 20.3 g. of isophthalic acid dichloride and 20.3 g. of terephthalic acid dichloride were reacted in the presence of 0.5 ml. of quinoline and 0.22 g. of lead (II) oxide in 600 ml. of orthodichlorobenzene. The reaction ended in 24 hours. The polymer was precipitated by methanol. The reduced viscosity amounted to 1.06.

EXAMPLE 23

73.2 g. of 2,2-bis-(3,5-dichloro-4-hydroxyphenyl)-propane, 20.3 g. of isophthalic acid dichloride and 20.3 g. of terephthalic acid dichloride were reacted in 600 ml. of orthodichlorobenzene in the presence of 0.5 ml. of quinoline and 0.8 g. (5.0 mole-percent) of titanium dioxide. The reaction ended in 24 hours. The polymer, after precipitation with methanol, had a reduced viscosity of 0.95.

EXAMPLE 24

In a flask in accordance with Example 14, 51.24 g. of 2,2-bis-(3,5-dichloro-4-hydroxyphenyl)-propane, 13.68 g. of 2,2-bis-(4-hydroxyphenyl)-propane and 40.6 g. of terephthalic acid dichloride were reacted in the presence of 0.5 ml. of quinoline and 0.116 g. of zirconium tetrachloride (0.5 mole-percent), in 600 ml. of orthodichlorobenzene. After 20 hours the reaction had ended. After precipitation with methanol, the polymer had a reduced viscosity of 1.15.

EXAMPLE 25

In a three-necked flask provided with stirrer, condenser and introduction tube, 73.2 g. of 2,2 - bis - (3,5-dichloro-4-hydroxyphenyl)-propane, 20.3 g. of isophthalic acid dichloride and 20.3 g. of terephthalic acid dichloride were reacted in the presence of 0.5 ml. of quinoline and 1.0 g. of magnesium chips in 600 ml. of O-dichlorobenzene, with refluxing and introduction of nitrogen. 5 hours later the theoretical amount of HCl had been evolved. The polymer was precipitated by means of methanol. Reduced viscosity at 25° C: 0.7.

EXAMPLES 26 TO 41

The same procedure was followed as in Example 25, except that different amounts of magnesium chips were used, and the condensation time was different in some cases. The conditions in this regard and the results of the experiments are listed in Table 2.

Fore ease of comparison, the values from Example 25 are also listed in Table 2.

TABLE 2

| Example number: | Quantity of magnesium chips G. | Mole, percent | Condensation time, hours | Reduced viscosity |
|---|---|---|---|---|
| 25 | 1.0 | 20 | 5 | 0.70 |
| 26 | 0.75 | 15 | 6 | 0.70 |
| 27 | 0.75 | 15 | 20 | 0.68 |
| 28 | 0.75 | 15 | 30 | 0.69 |
| 29 | 0.5 | 10 | 5 | 0.4 |
| 30 | 0.5 | 10 | 10 | 1.0 |
| 31 | 0.5 | 10 | 15 | 1.24 |
| 32 | 0.5 | 10 | 20 | 1.3 |
| 33 | 0.4 | 8 | 5 | 0.32 |
| 34 | 0.4 | 8 | 20 | 1.22 |
| 35 | 0.4 | 8 | 30 | 1.22 |
| 36 | 0.24 | 5 | 15 | 1.0 |
| 37 | 0.24 | 5 | 25 | 1.4 |
| 38 | 0.02 | 0.5 | 15 | 0.9 |
| 39 | 0.02 | 0.5 | 25 | 1.2 |
| 40 | 0.01 | 0.25 | 20 | 0.85 |
| 41 | 2.5 | 50 | 5 | 0.71 |

EXAMPLE 42

The same procedure was followed as in Example 36, except that, in place of 73.2 g. of 2,2-bis-(3,5-dichloro-4-hydroxyphenyl)-propane, 74.3 g. where used, i.e. an excess of 1.5 mole-percent. The product had a lower degree of polymerization than in Example 12. Furthermore, this polymer had terminal —OH groups. The reduced viscosity amounted to 0.75.

EXAMPLE 43

The same procedure was followed as in Example 25, except that 0.48 g. (10 mole-percent) of magnesium chips were used instead of 1.0 gram, and monochlorobenzene was used instead of O-dichlorobenzene. The reaction ended in 24 hours. The resulting polymer had a melting range from 320 to 350° C. and a reduced viscosity of 1.18. This experiment shows that, if the concentration of the activator in the reaction mixture is high enough, a sufficiently high degree of polymerization can be attained, even when lower-boiling solvents such as monochlorobenzene (B.P. 131.7° C.) are used.

It will be appreciated that the instant specification and examples are set forth by way of illustration and not limitation, and that various modifications and changes may be made without departing from the spirit and scope of the present invention.

What is claimed is:

1. In the production of halogen-containing polyaryl esters by the polycondensation of halogen-containing diphenols and aromatic acid dichlorides in the presence of a catalyst comprising a tertiary amine, an acid amide or mixtures thereof, the improvement which comprises effecting the condensation in the presence of about 0.001 to 50 mole-percent based on the acid dichloride, of at least one activator selected from the group consisting of magnesium, magnesium compounds and oxides, chlorides or hydroxychlorides of Cu, Zr, Sn, Ti, V, Pb and Fe.

2. A process according to claim 1, wherein the activator comprises $MgCl_2$ or mixtures thereof.

3. A process according to claim 1, wherein the activator comprises an alloy of at least one metal selected from the group consisting of Mg, Cu, Zr, Sn, Ti, V, Pb and Fe.

4. A process according to claim 1, wherein the activator comprises CuO, CuCl or mixtures thereof.

5. A process according to claim 1, wherein the activator comprises ZrCl$_4$.

6. A process according to claim 1, wherein the activator comprises SnCl$_2$.

7. A process according to claim 1, wherein the activator comprises TiCl$_4$, TiO$_2$ or mixtures thereof.

8. A process according to claim 1, wherein the activator comprises VOCl$_3$.

9. A process according to claim 1, wherein the activator comprises PbO.

10. A process according to claim 1, wherein the activator comprises Fe$_2$O$_3$.

11. A process according to claim 1, wherein the condensation is effected in solution in an organic solvent.

12. A process according to claim 11, wherein said catalyst comprises a tertiary amine, and said activator comprises a member selected from the group consisting of MgO, MgCl$_2$, a magnesium alloy and mixtures thereof, said activator being present in about 0.01 to 5 mole-percent based on the acid dichloride.

References Cited
FOREIGN PATENTS

| | | |
|---|---|---|
| 1,547,346 | 11/1968 | France. |
| 2,011,395 | 2/1970 | France. |
| 1,805,920 | 6/1970 | Germany. |

MELVIN GOLDSTEIN, Primary Examiner

U.S. Cl. X.R.

260—47 C, 49